United States Patent [19]

Zuckerman et al.

[11] 4,111,048
[45] Sep. 5, 1978

[54] FLUID PARAMETER SENSING APPARATUS

[76] Inventors: Robert E. Zuckerman, 36 Red Spring La., Glen Cove, 11542; Michael J. Merendino, 1441 E. 64th St., Brooklyn, both of N.Y. 11234

[21] Appl. No.: 779,736

[22] Filed: Mar. 21, 1977

[51] Int. Cl.² .......................................... G01N 25/62
[52] U.S. Cl. .................................................. 73/338
[58] Field of Search ................... 73/338, 420, 422 R, 73/23, 1 G, 340-342; 62/176 E

[56] References Cited

U.S. PATENT DOCUMENTS

| 2,336,242 | 12/1943 | Hanson | 62/176 E |
| 3,375,721 | 4/1968 | Joesting | 73/420 |
| 3,413,855 | 12/1968 | Bloom | 73/420 |
| 3,913,344 | 10/1975 | Holloway et al. | 62/176 E |

*Primary Examiner*—Donald O. Woodiel
*Attorney, Agent, or Firm*—Hubbell, Cohen, Stiefel & Gross

[57] ABSTRACT

An improved fluid parameter sensing apparatus particularly adapted for comparing one value of at least one air parameter as sensed at a first location in an air treatment system with at least one other value of the air parameter as sensed at at least a second location in the air treatment system includes a housing defining a pneumatic chamber; first means for feeding a stream of air from the first location to the housing; second means for feeding a stream of air from the second location to the housing; means for alternately admitting air from the first and second air stream feeding means to the chamber; sensing means disposed in the chamber for providing an output signal proportional to the at least one air parameter; means connected to the output of the sensing means for comparing a first output signal from the sensing means with a second output signal from the sensing means, the second signal being spaced in time relative to the first signal; and means operatively connected to the air admitting means for controlling the operation of the comparator means in synchronization with the operation of the air admitting means, the controlled operation resulting in the first output signal from the sensing means being proportional to the one value of the air parameter and the second output signal from the sensing means being proportional to the other value of the air parameter.

11 Claims, 5 Drawing Figures

FLUID PARAMETER SENSING APPARATUS

BACKGROUND OF THE INVENTION

1. Field of the Invention

This invention pertains generally to fluid treatment systems and more particularly to an apparatus for sensing at least one fluid parameter at at least two different locations in said system.

2. Prior Art

As a result of the ever increasing cost of energy there has been an increased demand in the air refrigeration industry, as in other industries, for systems designed to reduce energy consumption. For example, "Economizer Cycles", designed to shut down the refrigeration apparatus and provide free cooling to the conditioned space whenever possible are now common hardware in most air refrigeration systems.

More recently, air refrigeration systems have been designed to cool the outside air, as opposed to the return air, whenever the enthalpy of the former is lower of that of the latter. Essential to these systems are sensors disposed in appropriate locations throughout the system. Typically, the signals from these sensors are fed to a control center which then positions the system dampers to minimize energy consumption. Typical means for sensing air enthalpy in such systems include sensing the wet bulb temperature of the air or sensing two other air parameters, such as dry bulb temperature and relative humidity from which enthalpy is derivable. Exemplary enthalpy controlled air refrigeration systems are disclosed in U.S. Pat. No. 3,913,344 issued to Holloway, et al and U.S. Pat. No. 3,979,922 issued to Shavit.

One of the major drawbacks of any air refrigeration system which compares an air parameter at two spaced locations in the system by comparing signals generated by separate sensors disposed at these locations is that the validity of the comparison is dependent upon accurate calibration of the sensors. An invalid comparison could in turn result in improper system control with the result that energy is wasted.

SUMMARY OF THE INVENTION

The improved fluid parameter sensing device of the present invention is intended for use in a system of the type wherein at least one fluid parameter is to be sensed at at least two spaced locations in the system.

According to the present invention, the preferred fluid parameter sensing device comprises a pneumatic chamber; first means for directing fluid from a first location in the system to the chamber; second means for directing fluid from a second location in the system to the chamber; means for alternately admitting fluid from the first and second fluid directing means to the chamber; a sensor disposed in the chamber, the sensor being adapted to provide a signal proportional to the value of the fluid parameter being sensed; means sychronized with the admitting means and operatively connected to the output of the sensor for providing a first signal proportional to the value of said one fluid parameter at the first location and a second signal proportional to the value of said one fluid parameter at the second location; and means for discharging fluid from the chamber. Means are also provided for comparing the first and second signals. The output of the comparator may be a control signal which may then be used, for example, to control the position of the dampers in an air refrigeration system.

In air refrigeration systems of the type wherein damper control is effected based on a comparison between outside and return air enthalpies, for example, the present invention, by employing a single sensing device, eliminates calibration errors normally present when two separate sensors are employed. This in turn permits more efficient positioning of the dampers with the result that energy conservation is maximized.

The preferred structural embodiment of the present invention as well as further features and advantages thereof will be more fully apparent from the following detailed description and annexed drawings.

DETAILED DESCRIPTION OF THE PREFERRED EMBODIMENT

Figure 1:
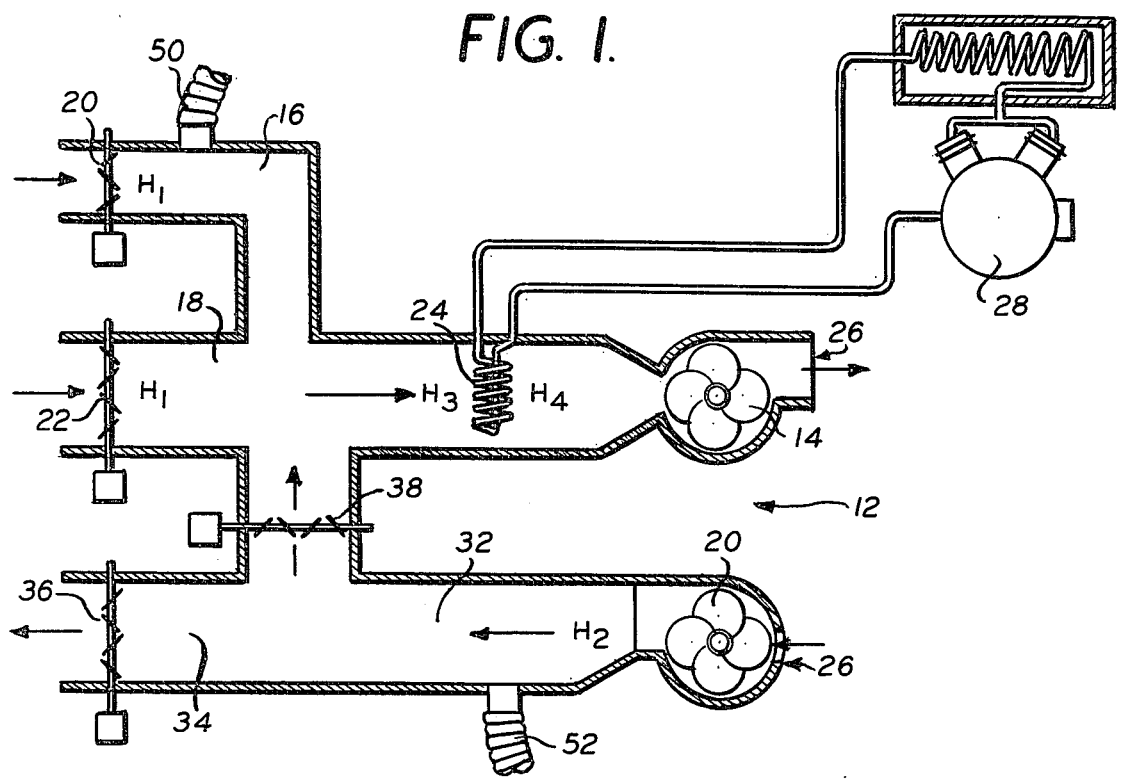
FIG. 1 is a diagrammatic representation of a conventional enthalpy controlled air refrigeration system with which the fluid parameter sensing apparatus of the present invention may be employed.
Figure 2:
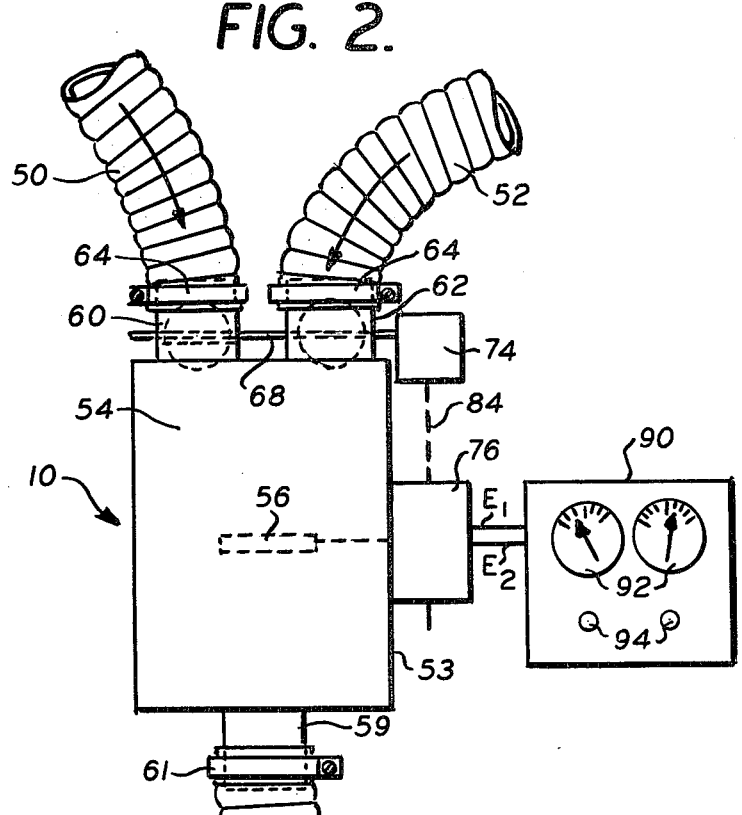
FIG. 2 is a diagrammatic representation of the preferred fluid parameter sensing apparatus of the present invention.

Referring now to FIG. 2 in the drawings in which the arrows indicate direction of air flow, the preferred fluid parameter sensing apparatus 10 in accordance with the present invention is illustrated. As presently preferred and shown, the apparatus 10 illustrated in FIG. 2 is particularly adapted for sensing air parameters, although skilled art workers will immediately recognize that apparatus 10 may be employed to sense various parameters of any other gaseous or liquid medium. For purposes of illustration, the apparatus 10 will be described in conjunction with the enthalpy controlled air refrigeration system 12 illustrated diagrammatically in FIG. 1.

The system 12 is intended to be exemplary of air treatment systems generally and forms no part of the present invention. As shown in FIG. 1, the system 12 may include a supply fan 14 which draws outside air into the system through the minimum 16 and maximum 18 outside air intake ducts. As shown, the minimum outside air intake duct 16 is provided with a first set of motorized dampers 20 and the maximum outside air intake duct 18 is provided with a second set of motorized dampers 22. Taken together, the dampers 20 and 22 regulate the amount of outside air drawn into the system by the fan 14. Fan 14 draws the outside air across the cooling coil 24 and supplies it to the conditioned space 26, the coil 24 operating in conjunction with, for example, the compressor 28 and condenser 30 to cool the air supply to the space 26.

A return fan 30 draws air from the space 26 into the return duct 32. As will become more fully apparent as this description progresses, the return air is either spilled to the outside through a spill duct 34 or returned to the cooling coil 24. A third set of motorized dampers 36 in the spill air duct 34 regulates the amount of return air spilled to the outside, while a fourth set of motorized dampers 38 regulates the amount of return air recirculated to the cooling coil 24.

Typically, air refrigeration system 12 will be designed to operate such that whenever the enthalpy of the outside air is lower than the enthalpy of the return air, the dampers will be positioned to supply outside air to cooling coil 24 and spill the return air to the outside. This corresponds to dampers 20, 22 and 36 being opened and dampers 38 being closed. Conversely, whenever the enthalpy of the return air is lower than that of the outside air, the dampers will be positioned to recirculate return air to cooling coil 24. In this case only the minimum amount of outside air required by law to maintain the freshness of the air in the conditioned space 26 will be drawn into the system. This corresponds to dampers 22 and 36 being closed and dampers 20 and 38 being opened.

It is thus apparent that operation of the system 12 requires the enthalpies of both the outside air and return air to be sensed and compared. Proper functioning of the system 12 is therefore dependent on the accuracy of the comparison, which in the case of a system employing two separate sensors requires that both sensors be accurately calibrated. This is especially true in those situations where the enthalpies of the outside and return air are close and improper calibration could result in improper positioning of the dampers. This problem is overcome by the improved air parameter sensing device of the present invention.

Referring to FIG. 2, the preferred fluid parameter sensing device 10 includes means, preferably comprising air conduits 50 and 52, for directing air from the minimum outside air intake duct 16 and the return air duct 32 to a pneumatic chamber 54 defined by a housing 53. Conduits 50 and 52 are preferably comprised of heat insulating material such as sheet metal with fiberglass insulation to prevent heat transfer to or from the air in these conduits. As shown, the chamber 54 has a single enthalpy sensor, preferably comprising a wet bulb temperature sensor 56, disposed therein.

A pair of connecting conduits 60 and 62 preferably integral with housing 53 are disposed intermediate the air conduits 50 and 52 respectively, and the chamber 54. It will be apparent to the skilled art worker that the connections between the conduits 50 and 52 and the chamber 54 should be air-tight both to prevent contamination of the air in the chamber 54 and to prevent the escape of air from the conduits 50 and 52. As shown, air conduits 50 and 52 are of preferably circular cross section, the diameter of the tubing preferably being substantially equal to the diameter of connecting conduits 60 and 62. Thus, and as shown, an air-tight seal between air conduits 50 and 52 and connecting conduits 60 and 62 is maintained by forcing the ends of the air conduits 50 and 52 over the free ends of the connecting conduits 60, 62. For this purpose the conduits 60, 62 should be comprised of a rigid material such as, for example, metal or plastic. Suitable clamping means such as, for example, hose clamps 64, are used to secure air conduits 50 and 52 in air-tight sealing relation with connecting conduits 60 and 62.

As presently preferred and shown, a suction conduit 58 communicates with the chamber 54 and serves to draw air from the conduits 50 and 52 through the chamber past sensor 56. Preferably, and as shown, suction conduit 58 communicates with the chamber opposite the air conduits 50 and 52. The conduit 58 is connected in air-tight sealing relation with chamber 54, preferably by employing an arrangement similar to that used with air conduits 50 and 52. Thus, conduit 58 is fastened about connecting conduit 59 by hose clamp 61.

Figure 3:
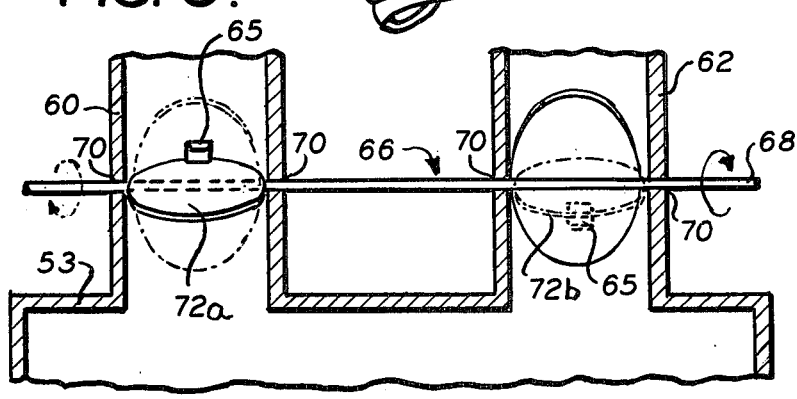
FIG. 3 is a perspective view showing the preferred damper means of the present invention.

The device 10 also includes damper means for alternately admitting the outside and return air streams into chamber 54. While a variety of arrangements are suitable for this purpose, the damper means 66, best shown in FIG. 3, is preferred. Thus, the damper comprises an elongated shaft 68 which extends through a plurality of registered apertures 70 in the connecting conduits 60 and 62. As presently preferred and shown, the apertures 70 are so positioned that the portions of shaft 68 in conduits 60 and 62 define diameters thereof. The shaft 68 is fitted for free rotation in the apertures 70 while maintaining the necessary air-tight seal. This may be accomplished, for example, by disposing Teflon grommets (not shown) in the apertures 70. In such case the diameter of the shaft 68 should be slightly larger than the diameter of the inside annulus of the grommets. Disposed on the portions of the shaft 68 extending through the connecting conduits 60 and 62 are sealing plates 72a and 72b, respectively. As shown, each of the plates 72 has a circular cross section and a diameter substantially equal to the diameters of the conduits 60 and 62. As illustrated in FIG. 3, the plates 72 are disposed on shaft 68 such that the planes defined by the plates 72 are orthogonal.

Thus, it will be apparent that when the plane of plate 72a is perpendicular to the axis of the connecting conduit 60 thus pneumatically sealing air conduit 50 from chamber 54, plate 72b will be positioned to admit air from the conduit 52 into the chamber (solid lines in FIG. 3). By rotating the shaft 68 90° in either a clockwise or counterclockwise direction the reverse situation will occur, that is, the flow of air from conduit 52 into chamber 54 will be blocked while the flow of air from the conduit 50 into the chamber 54 will be unobstructed (dotted lines in FIG. 3). Preferably, the means for rotating the shaft 68, which may comprise, for example, a motor 74 (illustrated diagrammatically in FIG. 2) will alternately rotate the shaft 68 in one direction and then the other. Stops 65 may then be provided on the inner walls of the conduits 60 and 62 to insure that the plates 72 cannot be rotated through an angle of greater than 90° (see FIG. 3).

Figure 4:
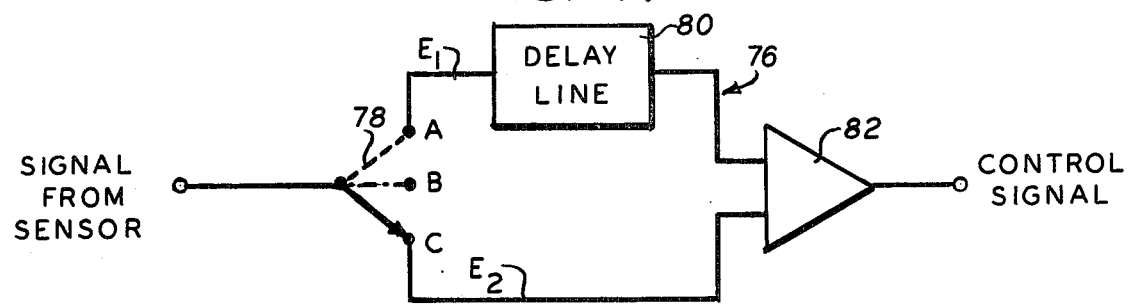
FIG. 4 is a schematic representation of the preferred comparator circuit.

Referring now to FIGS. 2 and 4, operatively connected to the sensor 56 is a comparator 76. The comparator 76 is provided with the capability of receiving two signals, spaced in time, from the sensor 56, comparing them, and then issuing a signal indicative of which signal has the higher (or lower) value. Assuming that the signal provided by sensor 56 is electronic, the comparator 76 may comprise, for example, the circuit illustrated diagrammatically in FIG. 4 wherein motor 74 is connected to the switch 78 to activate the switch upon each rotation of the shaft 68. Means may be readily devised by skilled art workers for controlling the switch 78 in this manner, this cooperation between motor 74 and switch 78 of comparator 76 being illustrated diagrammatically by the dotted line 84 in FIG. 2.

In FIG. 4, switch position A corresponds to the damper 66 being positioned to admit air from conduit 50 to chamber 54. In this position, the signal issuing from the sensor 56 (signal E1), which is proportional to the enthalpy of the return air, is fed into delay line 80. When shaft 68 is rotated to block the flow of air from air conduit 50 and admit air from the air conduit 52 into chamber 54, the switch 78 is moved to position B. In this position the signal from the sensor (signal E2), which is proportional to the enthalpy of the outside air, is fed directly to the differential amplifier 82. By adjusting the time delay of delay line 80 to equal the time interval between rotations of the shaft 68, signals E1 and E2 are applied to the differential amplifier 82 simultaneously. The output of differential amplifier 82 is a control signal which may then be utilized to control the position of dampers 22, 36, and 38 in the manner described above. The control signal may comprise, for example, a positive voltage signal if signal E1 exceeds signal E2 and a negative voltage signal if signal E2 exceeds signal E1.

Preferably, there is a pause after each rotation of the shaft 66 before information from the sensor 56 is communicated to the comparator 78. This pause allows substantially all the air in the chamber 54 from one air stream to be removed by the suction conduit 58 before the enthalpy of the other air stream is sensed. This may readily be accomplished by moving the switch 78 to a neutral position (position C in FIG. 3) upon each rotation of the shaft 68, the switch remaining in this position until sufficient time has elapsed to evacuate chamber 54. Thus assuming switch 78 is initially in position A, which corresponds to air from conduit 50 entering chamber 54, upon rotation of the shaft 68 to block conduit 50 and open conduit 52, the switch 78 will be moved to position C until the chamber 54 is evacuated. With the shaft 68 remaining in this position, the switch 78 will then be moved to position B wherein the enthalpy of the air in conduit 52 will be sensed. Means may be readily devised by the skilled art worker for controlling the operation of switch 78 in this manner. Preferably, the output of differential amplifier 82 is "frozen" as long as switch 78 is in position C in order to insure continuous control of dampers 22, 36 and 38 by the device 10. This may be readily accomplished by the skilled art worker by a wide variety of means (not shown).

As presently preferred and shown in FIG. 2, signals E1 and E2 are also fed to an enthalpy indicator 90. As shown, indicator 90 has a pair of gauges 92 which are calibrated to provide a direct visual readout of the enthalpies of the outside and return air streams. Means, comprising for example lights 94, may be provided to indicate which air stream has the higher (or lower) enthalpy.

Figure 5:
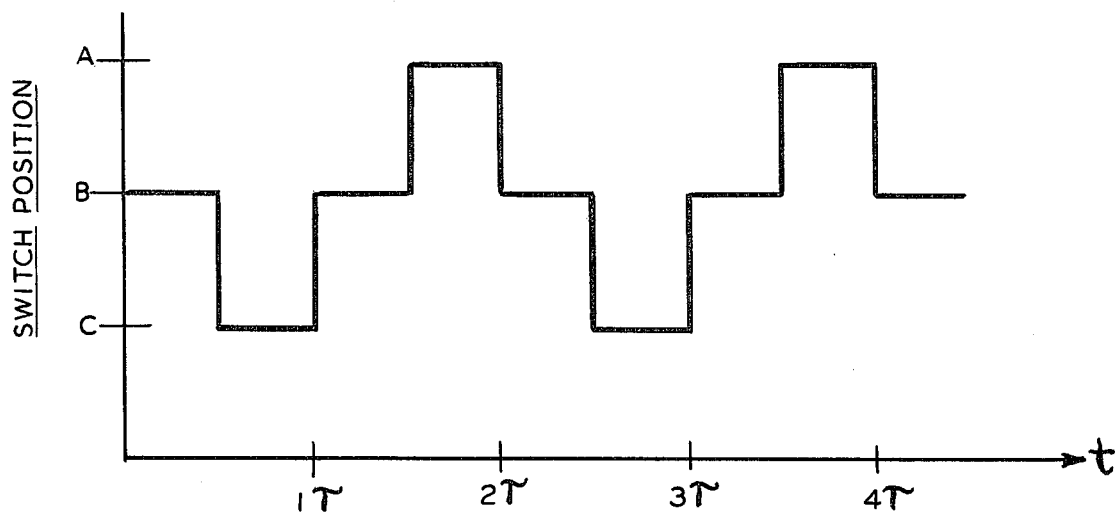
FIG. 5 is a graph showing the preferred operation of the synchronized switching means of the present invention.

Referring now to the graph of FIG. 5 the preferred relationship between movement of switch 78 and rotation of shaft 68 is illustrated. In FIG. 5, the time interval between rotations of shaft 68 is $\tau$. Preferably $\tau$ is about 10 minutes. As illustrated by the portion of the graph between $1\tau$ and $2\tau$, it is seen that the switch 78, initially in position B, is first moved to position C where, as described above, no information from sensor 56 is communicated to comparator 76. Switch 78 remains in position C for a time interval (shown as $\tau/2$, by way of example) sufficient to effectuate complete evacuation of chamber 54 by suction conduit 58. Switch 78 is then moved to position B where, as described above, the signal from sensor 56 (corresponding to the enthalpy of the outside air) is transmitted to delay line 80 (having delay time $\tau$) and then to differential amplifier 82. At time $2\tau$ the shaft 68 is again rotated, this time admitting return air to the chamber 54. The switch 78 is simultaneously moved to position C to allow sufficient time for chamber 54 to be evacuated. At time $2.5\tau$ switch 78 is moved to position B where the signal from sensor 56, (corresponding to the enthalpy of the return air) is transmitted directly to differential amplifier 82. Signals E1 and E2 are then compared by the differential amplifier 82 as is more fully described above. At time $3\tau$ shaft 68 is again rotated, the switch 78 again being moved to position C marking the completion of one full cycle of switch 78.

The sensing device 10 will preferably remain activated as long as system 12 is in use, although, as will be apparent to the skilled art worker, operation of device 10 may be periodically interrupted without adversely affecting the functioning of system 12.

It will be apparent to the skilled art worker that a wide variety of variations may be made to the preferred air parameter sensing device 10 without departing from the spirit and scope of the present invention. For example, sensors other than the wet bulb temperature sensor 56 may be employed for sensing the enthalpy of air in chamber 54. Thus, dry bulb temperature and relative humidity may be sensed, these signals then being fed into a "computer" which is "programmed" with the psychometric chart. As will be apparent to the skilled art worker, once any two parameters represented on the chart are known, any other air parameter may be determined. Thus, by programming the computer with parameters corresponding to a sufficient number of points on the chart, and providing the computer with interpolation means, any of the various air parameters represented on the chart may be determined. Thus, for example, if the dry bulb temperature and relative humidity are sensed, the computer can produce outputs corresponding to enthalpy, dew point temperature, wet bulb temperature, grains of moisture per pound of air, vapor pressure, etc. If desired, these parameters could then be displayed on suitable indicating means. The computer could also be equipped with a comparator which would provide a control signal corresponding to the control signal provided by comparator 76 in FIG. 2.

It will be apparent that air from more than two different locations in the system 12 may be sensed by the device 10. Thus, assuming air from N spaced locations is to be sensed, means would be provided for alternately admitting air from each of these N locations into chamber 54. Switch 78 would then comprise an N position switch sychronized to continuously move between positions 1 through N. Switch position 1 would correspond to the damper means being positioned to admit air from location 1 to chamber 54, switch position 2 corresponding to the damper means being positioned to admit air from location 2 to chamber 54, etc. If desired, switch 78 could be equipped with a neutral position for reasons more fully described above. The signals from each switch position could then be displayed or compared. Alternatively, these signals could be fed into a computer, such as the computer described above, where a full range of air parameters for each of the N locations could be determined and compared. Suitable control signals could then be sent to the air treatment system.

Furthermore, while the signals from sensor 56 and amplifier 82 are preferably electronic, other types of signals, for example hydraulic or pneumatic signals, may also be advantageously employed.

It will also be apparent that while the fluid parameter sensing device 10 has been described in connection with air enthalpy comparison, any other gas or liquid parameter could also be sensed and compared by disposing a suitable sensor in chamber 54.

Since these and other variations are within the scope of the present invention, the preceding description should be construed as illustrative and not in the limiting sense, the scope of the present invention being defined by the following claims.

What is claimed is:

1. In a fluid parameter sensing apparatus for use in a fluid system having a plurality of fluid flow paths, said fluid parameter sensing apparatus being of the type including means for comparing one value of at least one fluid parameter as sensed at a first location in said fluid system with at leas one other value of said at least one fluid parameter as sensed at at least a second location in said fluid system, the improvement comprising:

a housing defining a pneumatic chamber, first means for feeding a stream of said fluid from said first location to said housing; second means for feeding a stream of said fluid from said second location to said housing; means for alternately admitting fluid from said first and second fluid stream feeding means to said chamber; sensing means disposed in said chamber for providing an output signal proportional to said at least one fluid parameter; means connected to the output of said sensing means for comparing a first output signal provided by said sensing means with a second output signal provided by said sensing means, said second signal being spaced in time relative to said first signal; and motor means operatively connected to said fluid admitting means and said comparing means for controlling the operation of said comparing means in sychronization with the operation of said fluid admitting means, said controlled operation resulting in one of said first and second output signals being proportional to said one value of said at least one fluid parameter and the other of said first and second signals being proportional to said other value of said at least one fluid parameter.

2. The apparatus of claim 1 wherein said fluid is air; wherein said first and second fluid stream feeding means comprise first and second pneumatic conduits in communication with said first and second locations, respectively, and said pneumatic chamber; and wherein said fluid admmitting means comprises: damper means disposed in said pneumatic conduits; and means for controlling the operation of said damper means to alternately pneumatically seal said first and second pneumatic conduits from said pneumatic chamber.

3. The apparatus of claim 2 wherein each of said first and second pneumatic conduits has a pair of registered holes therein; wherein said damper means comprises: a shaft extending through said registered pair of holes; a first plate secured to the portion of said shaft disposed in said first pneumatic conduit, said plate having a cross section substantially identical to the cross section of said first pneumatic conduit; a second plate secured to the portion of said shaft disposed in said second pneumatic conduit, said second plate having a cross section substantially identical to the cross section of said second pneumatic conduit, the planes of said plates defining an angle therebetween; and wherein said damper control means comprises means for rotating said shaft between a first position in which the plane of said first plate is perpendicular to the axis of said first pneumatic conduit and a second position in which the plane of said second plate is perpendicular to the axis of said second pneumatic conduit.

4. The apparatus of claim 3 wherein said defined angle is 90°, and wherein said shaft rotating means comprises means for rotating said shaft in 90° steps.

5. The apparatus of claim 4 wherein said shaft rotating means comprises means for alternately rotating said shaft 90° in one direction and then 90° in the other direction; and further comprising a protrusion on the inside wall of each of said pneumatic conduits, said protrusion in said first conduit contacting said first plate when said shaft is in said first position and said protrusion in said second conduit contacting said second plate when said shaft is in said second position whereby rotation of said shaft through an angle of greater than 90° in either direction is prevented.

6. The apparatus of claim 4 wherein a pair of protrusions is provided on the inside wall of at least one of said pneumatic conduits, one of said pair of protrusions contacting the plate disposed in said at least one pneumatic conduit when said plate is in sealing relation with said at least one pneumatic conduit, the other of said pair of protrusions contacting said plate disposed in said at least one pneumatic conduit when the other plate is disposed in sealing relation with the other pneumatic conduit whereby rotation of said shaft through an angle of greater than 90° in either direction is prevented.

7. The apparatus of claim 1 wherein said signal comparing means comprises:

a difference amplifier adapted to receive at least two input signals and provide an output signal indicative of which of said two input signals is greater;

switching means connected to the output of said sensing means, said switching means being movable between a first position in which the output from said sensing means is fed to one input of said difference amplifier and a second position in which the output of said sensing means is fed to the other input of said difference amplifier;

and delay means for time delaying the signal from one of said switch output positions before it is applied to the input of said difference amplifier, the delay time of said delay means corresponding to the period between each alternate admission of fluid from said first and second fluid stream feeding means to said chamber; and wherein said comparator operation controlling means comprises means for moving said switch between said first and second positions during each alternate admission of fluid from said first and second fluid stream feeding means to said chamber.

8. The apparatus of claim 7 and further comprising display means connected to said first and second switch output positions for displaying the values of said at least one fluid parameter at said at least first and second locations.

9. The apparatus of claim 2 wherein said at least one air parameter is enthalpy and wherein said sensing means comprises a wet bulb temperature sensor.

10. The apparatus of claim 2 wherein said sensing means comprises means for sensing at least two air parameters found on a psychometric chart; and wherein said first output signal comprises a first pair of signals proportional to said two air parameters as sensed at said first location and said second output signal comprises a second pair of signals proportional to said at least two parameters as sensed at said at least second location; and further comprising computer means for receiving said first and second signals and computing the value of at least one other air parameter found on said psychometric chart.

11. The apparatus of claim 10 and further comprising means for displaying said at least one other air parameter.

* * * * *

UNITED STATES PATENT OFFICE
CERTIFICATE OF CORRECTION

Patent No. 4,111,048          Dated September 5, 1978

Inventor(s) Robert E. Zuckerman and Michael M. Merendino

It is certified that error appears in the above-identified patent and that said Letters Patent are hereby corrected as shown below:

Column 4, line 64: "damper 66" should read -- damper means 66 --.
Column 5, line 17: "shaft 66" should read -- shaft 68 --.
Column 5, line 18: "comparator 78" should read -- comparator 76 --.
Column 5, line 55: "position B" should read -- position C --.
Column 5, line 55: "position C" should read -- position B --.
Column 5, line 58: "position C" should read -- position B --.
Column 5, line 61: "position B" should read -- position A --.
Column 5, line 67: "position C" should read -- position B --.
Column 6, line 1: "position B" should read -- position C --.
Column 6, line 7: "position C" should read -- position B --.
Column 6, line 47: "sychronized" should read -- synchronized --.
Column 6, line 51: "corresponding" should read -- would correspond --.

Signed and Sealed this

First Day of May 1979

[SEAL]

Attest:

RUTH C. MASON
Attesting Officer

DONALD W. BANNER
Commissioner of Patents and Trademarks